Jan. 14, 1941.   H. J. ZIMMERMAN   2,228,892
FLOWERPOT
Filed April 23, 1938

Inventor
HUGO JOHN ZIMMERMAN
By L. Edw. Flaherty
Attorney

Patented Jan. 14, 1941

2,228,892

UNITED STATES PATENT OFFICE 2,228,892

FLOWERPOT

Hugo John Zimmerman, Terre Haute, Ind.

Application April 23, 1938, Serial No. 203,866

2 Claims. (Cl. 47—38)

The present invention relates to a flowerpot, and more particularly to a device of this character which is adapted to supply the flower contained therein with the necessary water over a long period of time.

Botanists and those skilled in this particular art are well aware of the fact that it is necessary, depending upon the species of flower, to supply the same with water at certain intervals in order to obtain the best results. Consequently, through negligence, or during one's absence at vacation time or the like, the flowers do not receive the requisite amount of essential water, resulting in the ultimate death thereof.

It is therefore one of the objects of the present invention to provide a flowerpot which will supply, over a long period of time, the flower or flowers with the requisite amount of water and air.

It is a still further important object of the invention to provide a novelly constructed flower container or pot of this character which is neat in appearance, durable, and cheap to manufacture.

In the accompanying drawing wherein like numerals designate corresponding parts throughout the same:

Figure 1:
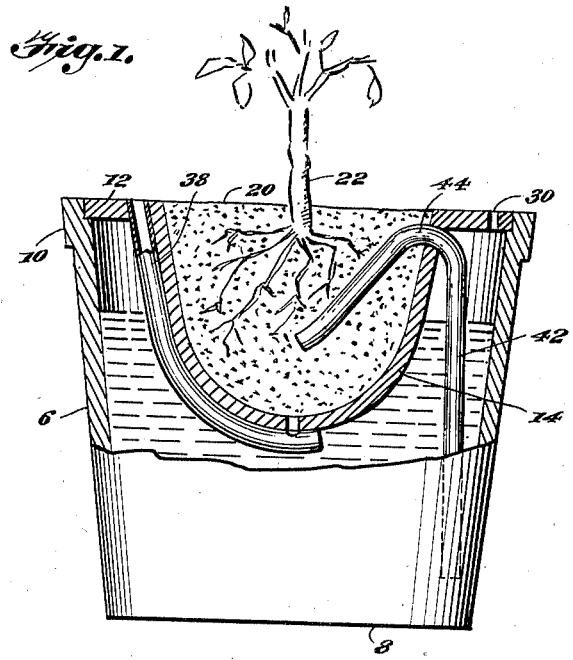
Figure 1 is a vertical sectional view of the novelly constructed flowerpot.
Figure 2:
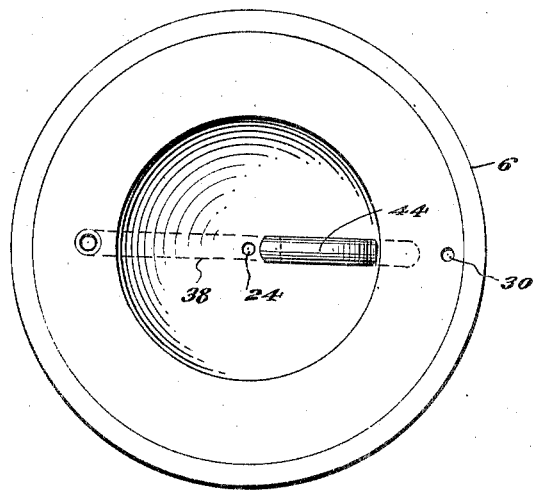
Figure 2 is a top plan view thereof.

In the accompanying drawing wherein, for the purpose of illustration, there is shown a preferred embodiment of the invention, and referring to Figures 1 and 2, the reference numeral 6 generally designates the container portion of the pot, which is substantially cylindrical in shape, tapering gradually inwardly toward the bottom 8 thereof. As clearly illustrated, the upper portion of the container 6 is provided with a flange 10 with an annular recess in the upper portion thereof.

Within the recess there is secured the top 12 which is provided with a centrally depressed portion defining a false bottom 14 and a soil cavity in which there is placed the soil 20 in which the flower, plant, or the like 22 grows. It will be observed that the false bottom 14 defining the soil cavity depends in the container 6 and is provided with a centrally disposed aperture 24.

A supply tubing 38 is secured to the outer side of the false bottom 14, the inner end being closed and provided with an aperture 40 therein which registers with the aperture 24 in the bottom of the false bottom 14. It will be seen that this end terminates substantially at the bottom central portion of the false bottom 14 while the upper end is in registering engagement with the aperture in the top 12 communicating the lower portion of the soil with the atmosphere. The false bottom 14 is provided with an aperture therein adjacent the upper portion of the top, and through which extends or projects the upper end of the water supply tubing 42. It will be observed that the upper end 44 of the water supply tubing 42 extends into the cavity and terminates at substantially the central portion thereof to the end that the water is supplied to the soil and consequently to the root at the central portion from which it may, by capillary attraction, move upwardly or downwardly to feeding engagement with the root. The other portion of the tubing 42 depends into the liquid in the container 6, the free end terminating short of the bottom. It will thus be seen that the plant is supplied with a regular abundance of air and water, to the end that depending upon the quantity of water in the container 6, the same will be automatically fed to the plant until the water is exhausted. The container 6 may then be refilled with water through the opening 30.

While there is shown, for the purpose of illustration, a preferred embodiment of the invention it is to be understood that it is capable of various changes without departing from the spirit and scope thereof, and it is therefore intended that only such limitations shall be imposed thereon as are indicated in the prior art or in the appended claims.

What is claimed is:

1. A flowerpot of the class described comprising a liquid container, a false bottom therein defining a soil receiving cavity, said bottom having a single aperture in the bottom portion thereof, conduit means communicating the soil receiving cavity through said aperture with the atmosphere, and conduit means in said container for communicating the liquid in said container to said cavity.

2. A flowerpot of the class described comprising a liquid container, a false bottom therein defining a soil receiving cavity, said bottom being provided with an aperture in the lower portion thereof, conduit means communicating the soil receiving cavity through said aperture with the atmosphere, and conduit means depending in said container and terminating short of the bottom thereof, the other end of the conduit extending in the soil receiving cavity and terminating at substantially the central portion of the cavity for supplying water thereto.

HUGO J. ZIMMERMAN.